No. 841,408. PATENTED JAN. 15, 1907.
C. & E. J. KRUSE.
BREAD KNEADING AND MOLDING MACHINE.
APPLICATION FILED JUNE 19, 1906.
2 SHEETS—SHEET 1.
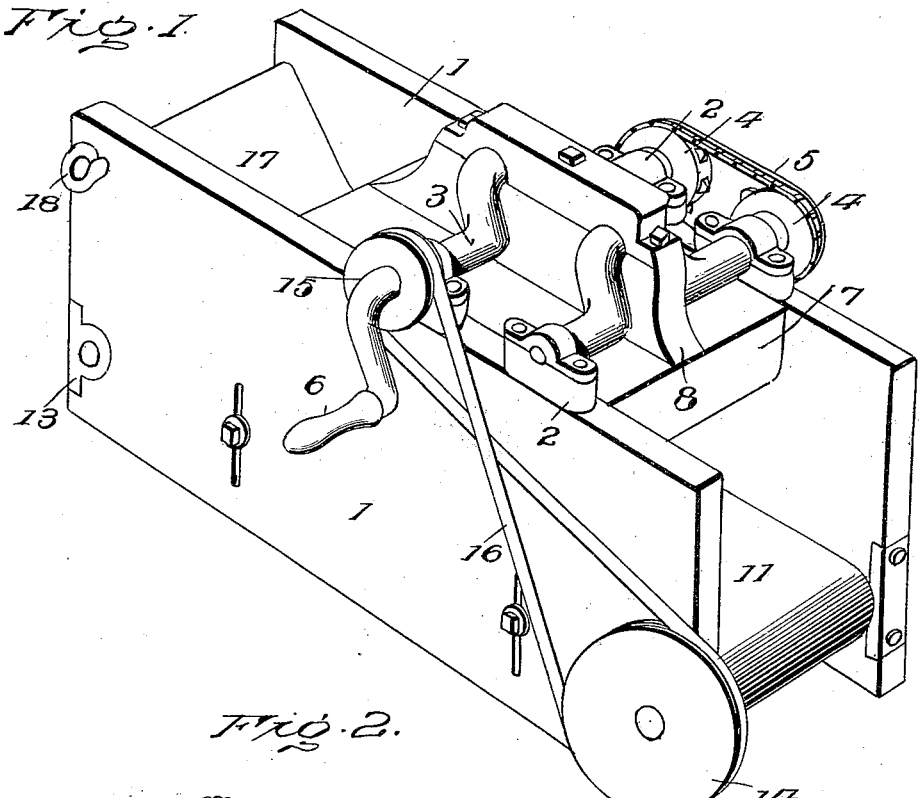
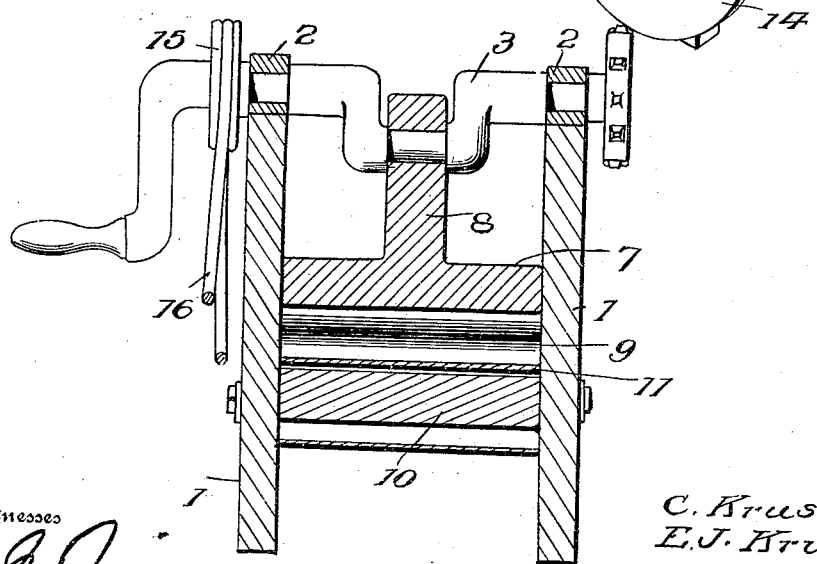

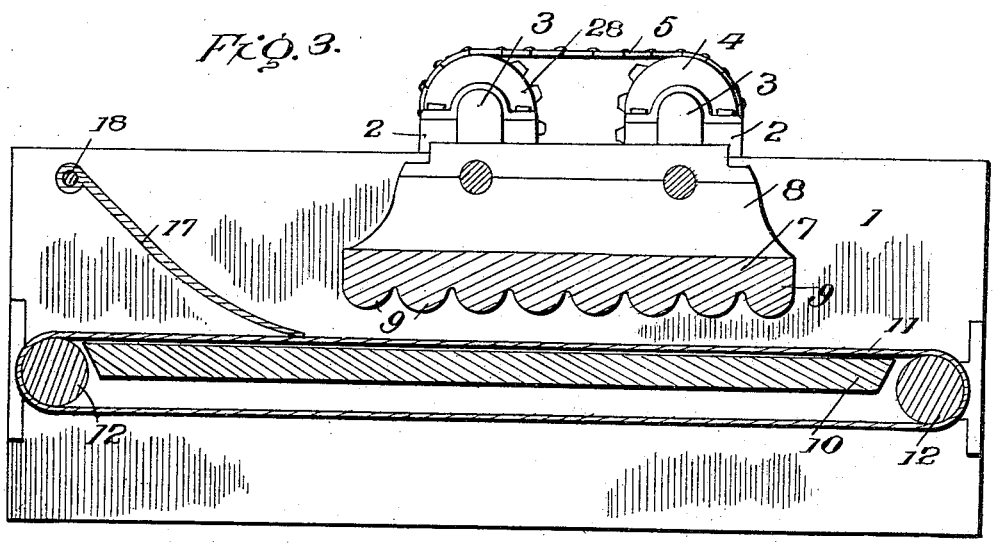
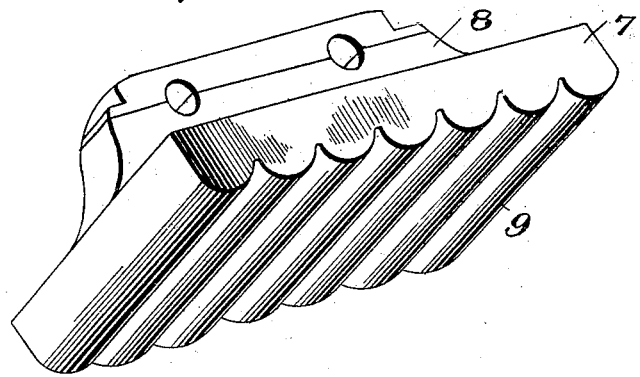

UNITED STATES PATENT OFFICE.

CARL KRUSE AND ERNST J. KRUSE, OF SEATTLE, WASHINGTON.

BREAD KNEADING AND MOLDING MACHINE.

No. 841,408.  Specification of Letters Patent.  Patented Jan. 15, 1907.

Application filed June 19, 1906. Serial No. 322,485.

*To all whom it may concern:*

Be it known that we, CARL KRUSE and ERNST J. KRUSE, citizens of the United States, residing at Seattle, in the county of King and State of Washington, have invented certain new and useful Improvements in Bread Kneading and Molding Machines, of which the following is a specification.

The object of our invention is to provide an improved construction of bread kneading and molding machine which will be composed of comparatively few and simple parts, which will be durable, and which will be efficient in operation to thoroughly knead the dough and retain the gases of fermentation therein in a finely-distributed manner and which will at the same time it is kneading the dough form it into a loaf, the parts being so arranged that loaves of different sizes may be formed by certain adjustments of the parts.

For a full description of the invention and the merits thereof and also to acquire a knowledge of the details of construction of the means for effecting the result reference is to be had to the following description and accompanying drawings, in which—

Figure 1 is a perspective view. Fig. 2 is a transverse sectional view. Fig. 3 is a vertical longitudinal section. Fig. 4 is a detail view of the kneading-board.

Corresponding and like parts are referred to in the following description and indicated in all the views of the drawings by the same reference characters.

Referring to the drawings, the numeral 1 designates the side bars of the framework or casing of our improved bread kneading and molding machine. Upon the upper edges of these side bars pillow-blocks 2 are mounted, and crank-shafts 3 are journaled in said pillow-blocks and extend in parallel relation transversely of the machine. Each crank-shaft is provided with a pulley 4 at one end, and said two pulleys are connected together by means of a belt 5, so that both shafts may work together. The shafts may be operated in any suitable manner, as by a handle 6, secured to the outer end of one of them.

A kneading and molding board 7, extending longitudinally of the framework or casing and fitting substantially the side bars 1, is provided with an upwardly-extending supporting-rib 8, journaled upon the cranks of the shafts 3. Hence as the crank-shafts 3 are rotated it is evident that the kneading and molding board 7 will have imparted to it a substantially circular vibratory motion. The lower face of the board 7 is provided with a series of transversely-extending corrugations 9.

The bottom 10 of the machine is constituted by a board supported in the side bars 1 in a vertically-adjustable manner, as by set-screws or the like. It is located underneath the board 7. An endless apron 11 is mounted to travel over the upper face of the bottom board 10 upon rollers 12, which are mounted in bearings 13 in the side bars. The shaft of one of these rollers 12 is extended at one end, and upon the shaft extension is mounted a relatively larger pulley 14, which is connected with a smaller pulley 15 on one of the crank-shafts by means of a belt 16. By this means as the kneading and molding board 7 is vibrated a traveling motion will be imparted to the apron 11. This motion, which is concurrent with the motion of the kneading and molding board, may be changed from one direction to the other, as required, by changing the driving-belt 16 from an untwisted to a twisted position, or vice versa.

17 designates a feed-plate freely supported at one end by a spindle 18, extending transversely of the casing or framework of the machine at one end of the latter. The feed-plate is adapted to be supported directly upon the apron 11 and indirectly by the bottom board 10, so that its inclinations may be varied according to the different elevations of the bottom 10, and it is to be noted that this inclined feed-plate, which is primarily intended to feed the dough into proper position for action thereupon by the corrugated board 7, will also act as a scraper for the apron and tend to keep the same sufficiently clean for its proper operation.

In practical use the dough to be kneaded and molded into loaves is fed down the inclined feed-plate 17 while the shafts 3 are being rotated by means of the handle 6 or similar actuating means. As the dough is caught between the members 7 and 10 it will be properly kneaded and at the same time will be carried forwardly toward the opposite end of the machine by the apron 11, which, as noted, travels in a horizontal plane underneath and in proper relation to the board 7. As the dough comes from the machine it is discharged in the form of loaves.

The sizes of these loaves, so far as their diameter is concerned, may be varied by vertically adjusting the bottom board 10.

Having thus described the invention, what is claimed as new is—

1. A dough kneading and molding machine, comprising a framework embodying vertical side bars, crank-shafts journaled on said side bars and connected together for simultaneous operation, a kneading and molding board mounted between said side bars and provided with an upwardly-extending rib journaled on the cranks of said shafts, the lower face of said board being formed with transverse corrugations, a bottom board underneath the first-named board, an apron designed to travel on said bottom board, an operative connection between the crank-shafts and said apron whereby they may be simultaneously actuated, and a freely-swinging feed-plate supported by said board and apron at one end of the machine, the free edge of said feed-plate resting upon the apron and thereby serving as a scraper therefor, in addition to feeding the dough into proper position for action thereupon by the corrugated board and bottom board.

2. A dough kneading and molding machine comprising a framework embodying vertically-extending side bars, a bottom board secured to said side bars between the same, said bottom board being vertically adjustable, a kneading and molding board provided on its lower face with corrugations and mounted between the side bars above the bottom board, crank-shafts journaled on said side bars and operatively supporting said corrugated board, an apron mounted to travel over said bottom board and an operative connection between one of said crank-shafts and said apron.

In testimony whereof we affix our signatures in presence of two witnesses.

CARL KRUSE. [L. S.]
ERNST J. KRUSE. [L. S.]

Witnesses:
E. G. BUECKER,
P. DENNINGER.